(12) United States Patent
Saxton

(10) Patent No.: US 8,534,761 B2
(45) Date of Patent: Sep. 17, 2013

(54) ARMREST ASSEMBLY FOR AIRCRAFT PASSENGER SEAT

(75) Inventor: Matthew J. Saxton, Clemmons, NC (US)

(73) Assignee: BE Aerospace, Inc., Wellington, FL (US)

( * ) Notice: Subject to any disclaimer, the term of this patent is extended or adjusted under 35 U.S.C. 154(b) by 456 days.

(21) Appl. No.: 12/776,564

(22) Filed: May 10, 2010

(65) Prior Publication Data

US 2011/0272991 A1 Nov. 10, 2011

(51) Int. Cl.
  *A47C 7/54* (2006.01)
(52) U.S. Cl.
  USPC ................................ 297/411.32; 297/DIG. 2
(58) Field of Classification Search
  USPC .......................... 297/411.32, 411.33, DIG. 2
  See application file for complete search history.

(56) References Cited

U.S. PATENT DOCUMENTS

| | | |
|---|---|---|
| 2,026,016 A | 12/1935 | Blood |
| 3,695,707 A | 10/1972 | Barecki et al. |
| 5,823,624 A | 10/1998 | Dahlbacka |
| 5,941,603 A * | 8/1999 | Wein .......................... 297/411.35 |
| 7,384,102 B2 * | 6/2008 | Chen et al. ................ 297/411.32 |
| 8,132,861 B2 * | 3/2012 | Cone .......................... 297/411.32 |
| 2004/0021349 A1 | 2/2004 | Longtin et al. |
| 2004/0217642 A1 | 11/2004 | Herault |
| 2010/0289317 A1 | 11/2010 | Cone |

OTHER PUBLICATIONS

May 25, 2011 International Search Report issued in International Application No. PCT/US2011/030326.
May 25, 2011 Written Opinion issued in International Application No. PCT/US2011/030326.

* cited by examiner

*Primary Examiner* — Anthony D Barfield
(74) *Attorney, Agent, or Firm* — Shumaker, Loop & Kendrick, LLP

(57) ABSTRACT

An armrest assembly including an armpan defining an elongate channel and including slide-lock structure positioned about a top opening of the channel and at opposing ends thereof for engaging an armcap, an armcap covering the channel and having complimentary slide-lock structure and defining at least one cavity for receiving overmold material of an armpad, and an overmolded armpad covering a portion of the armcap and filling the at least one cavity of the armcap to retain the armpad on the armcap.

20 Claims, 8 Drawing Sheets

ARMREST ASSEMBLY FOR AIRCRAFT PASSENGER SEAT

TECHNICAL FIELD AND BACKGROUND OF THE INVENTION

1. Field of the Invention

The present invention relates generally to a passenger seat armrest assembly, and more particularly, to an armrest assembly generally including an armpan and overlying armcap that slides into locking engagement with the armpan, and an overmolded armpad provided on the armcap for resisting delamination.

2. Background of the Invention

Aircraft passenger seat armrests are typically designed to provide occupant comfort with the added functionality of housing passenger controls, such as A/V and recline controls, among others. Armrests are typically pivotably secured to their respective seat frame such that they are capable of being selectively pivoted between stowed and in-use positions for comfort, to define passenger living spaces, as well as facilitate ingress and egress from the seat. While conventional armrests are functional, they typically lack underlying structure and component make-up/engagement that allows for a truly and readily customizable solution for carriers, as well as further lack the ergonomics and structure needed to provide a comprehensive seat control center. It is with regard to these shortcomings of prior art armrest designs that the present invention is directed and finds particular application.

BRIEF SUMMARY OF THE INVENTION

In one aspect, an aircraft passenger seat armrest assembly is provided herein.

In another aspect, an armrest assembly including an ergonomic armrest and armrest support member is provided herein.

In another aspect, an armrest assembly having the functionality of a comprehensive seat control center is provided herein.

In another aspect, a customizable armrest assembly is provided herein including a universal armpan configured to receive a plurality of interchangeable armcaps that secure to the armpan by way of slide-lock engagement and a single fastening point.

In another aspect, an armrest assembly is provided herein including part seam elimination in primary load paths for long-term dependability.

In another aspect, the armrest portion of the assembly has a scalloped gusset design for strength enhancement and added occupant hip room.

In another aspect, an armrest assembly including an overmolded armpad is provided herein to resist delamination.

In another aspect, an armrest assembly including an injection molded armcap and overmolded armpad is provided herein.

In another aspect, an armrest assembly is provided herein including slide-lock armcap attachment and securement by way of a single captured fastener with limited, discrete access.

In another aspect, the armrest assembly includes a stamped aluminum armpan incorporating tab and slot attachment for additional components.

In another aspect, an armrest assembly is provided herein including tooth-style indexing features for ensuring tight part fit.

In another aspect, an armrest assembly is provided herein including a one-piece stamped high-cycle leaf spring for biasing movement.

To achieve the foregoing and other aspects and advantages, in one embodiment the present invention provides an armrest assembly including an armpan defining an elongate channel and including slide-lock structure positioned about a top opening of the channel and at opposing ends thereof for engaging an armcap, an armcap covering the channel and having slide-lock structure complimentary to the armpan slide-lock structure for providing slide-lock engagement therewith, the armcap further defining at least one cavity for receiving overmold material of an armpad, and an armpad covering a portion of the armcap, the armpad comprising overmold material, at least a portion of which fills the at least one cavity of the armcap to retain the armpad on the armcap.

In accordance with another embodiment, the armrest assembly further includes an armrest support member pivotably connected to the armrest, and a rear end cover secured to the armpan, the rear end cover comprising two halves securing therebetween an end of the armrest support member between centering members, and a latch including a strike plate that engages a mechanical stop of the armrest support member to limit pivoting movement of the armpan relative to the armrest support member.

In accordance with another embodiment, the armrest support member defines a gradual curve terminating in spaced-apart first and second ends, and at least one opening therethrough for receiving a seat frame member, and the armpan defines a scalloped gusset for strength and added occupant hip room.

In accordance with another embodiment, an armrest assembly is provided including an upper armrest assembly including an armpan defining an elongate channel and including slide-lock structure positioned about a top opening of the channel and at opposing ends thereof for engaging an armcap, an armcap covering the channel and having slide-lock structure complimentary to the armpan slide-lock structure for providing slide-lock engagement therewith, the armcap further defining at least one cavity for receiving overmold material of an armpad, and an armpad covering a portion of the armcap, the armpad comprising overmold material, at least a portion of which fills the at least one cavity of the armcap to retain the armpad on the armcap, and an armrest support member pivotably connected to and supporting the upper armrest assembly.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

The present invention will now be described more fully hereinafter with reference to the accompanying drawing in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention.

Figure 1:
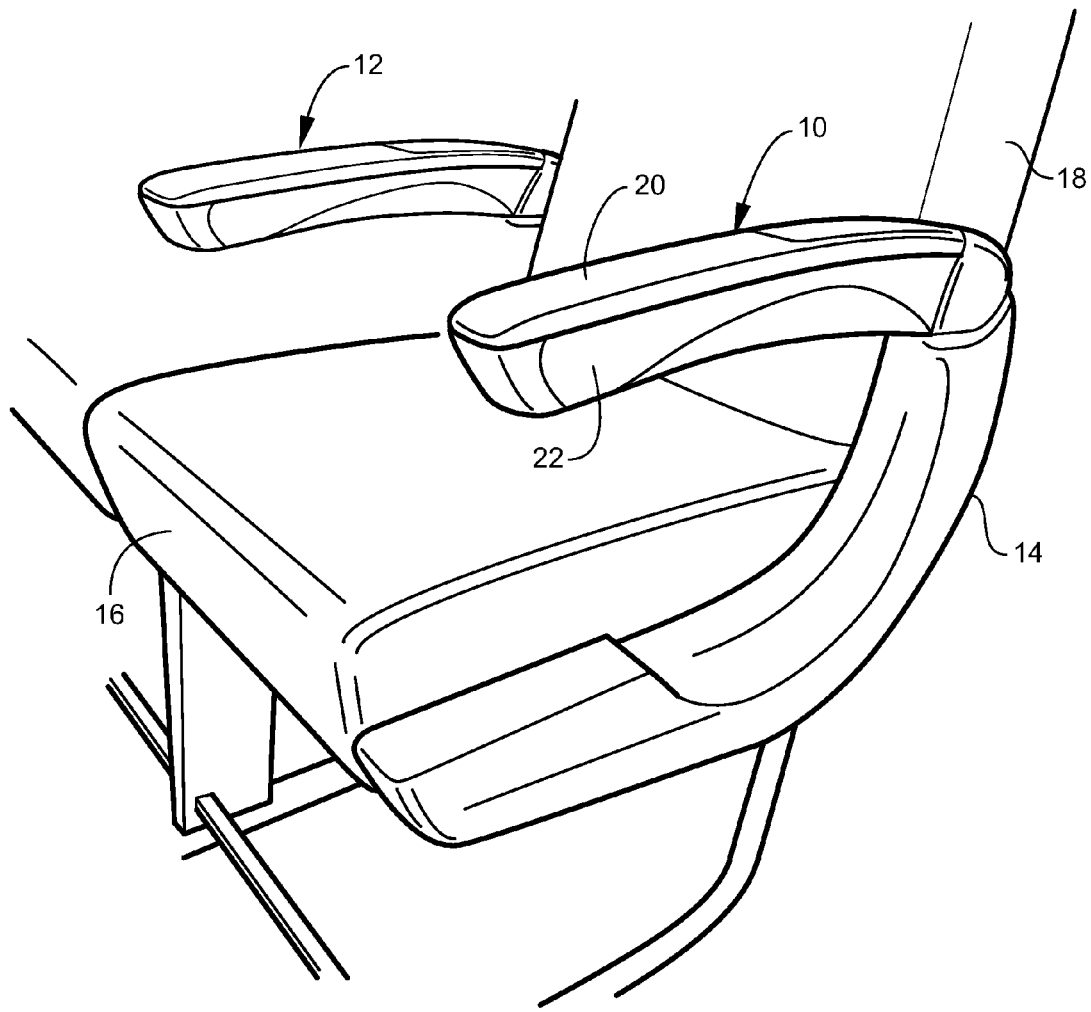
FIG. 1 is a perspective view of an aircraft passenger seat illustrating mid-row and row-terminating armrest assemblies in accordance with embodiments of the present invention.

Referring to FIG. 1, mid-row and row-terminating armrests of an exemplary aircraft passenger seat are shown at reference numerals 10 and 12, respectively. Specifically, armrest 10 terminates the row and is thus supported from beneath by side-mounted armrest support member 14 having a shape that generally follows alongside seat pan 16 and partway up seat back 18 in the form of a gradual curve. Armrest 12 is positioned mid-row and is thus supported between adjacent seat backs from beneath by the existing seat frame. Thus, the armrest assemblies provided herein include substantially identical upper armrest assemblies regardless of their position within a row, while row-terminating armrests require additional support member 14. It is intended that the armrest assemblies provided herein may be used in conjunction with a variety of existing seat types having a frame or other structure for attaching and supporting the armrest assemblies provided herein. As shown, support member 14 includes a decorative cover 15, such as molded plastic or like material, corresponding in look to its respective upper armrest assembly.

Armrests 10 and 12 are secured to their respective support member or seat frame in any suitable manner such that they are able to selectively pivot relative to the associated seat between stowed and deployed positions, with the deployed or "in-use" positions being illustrated in FIG. 1 with armrests 10 and 12 shown positioned generally horizontal or parallel to the underlying seat pan.

Figure 2:
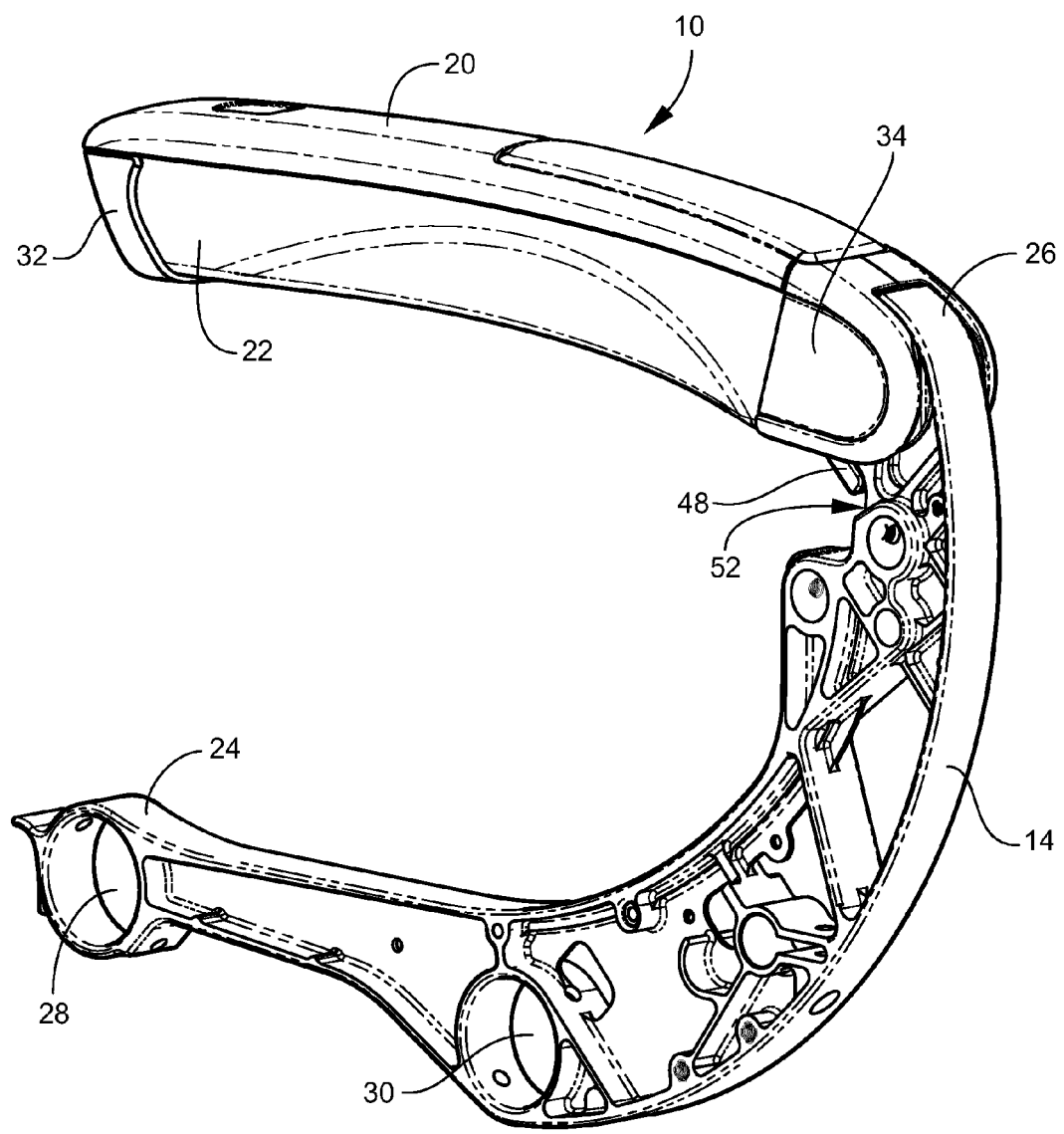
FIG. 2 is a perspective view of an armrest assembly including an armrest support member for attachment to a seat frame.

Referring to FIG. 2, armrest assembly 10 is shown isolated from its respective seat and supported from beneath and about its rear end by support member 14. As shown, support member 14 defines a gradual curve forming about a 90-degree angle between ends 24 and 26. End 24 defines first generally circular opening 28 therethrough for receiving a tubular frame member, as well as second generally circular opening 30 downstream of end 24 positioned in linear alignment along seat pan 16 for receiving a second tubular frame member. By providing spaced-apart attachment to the existing tubular frame, rotation of support member 14 is prevented, resulting in a fixed positioning of end 26 relative to the associated seat. It is envisioned that the support member attachment to the existing seat frame may be modified by one skilled in the art to accommodate the existing frame. Exemplary modifications may include alternative opening geometries, opening placement, and substitution of openings with conventional fasteners. Support member 14 further includes a plurality of stiffening ribs along its length for imparting structural rigidity. Support member 14 further defines a plurality of openings, such as internally threaded openings or the like, for receiving conventional fasteners for decorative covers and other components thereto.

The upper armrest assembly, such as armrest assembly 10, also referred to herein as "armrest 10," generally includes an armpan 22, armcap 20, front end cover 32 and rear end cover 34. As shown in the deployed position, armrest 10 defines a gradual curve along its length with the high point being about centered. Armpan 22 further defines a scalloped gusset for added occupant hip room. Referring to both FIGS. 1 and 2, the overall appearance of armrests 10 and 12, and support member 14 when applicable, is smooth and elegant and devoid of sharp corners, edges or components that could potentially cause snagging or injury upon contact therewith.

Figure 3:
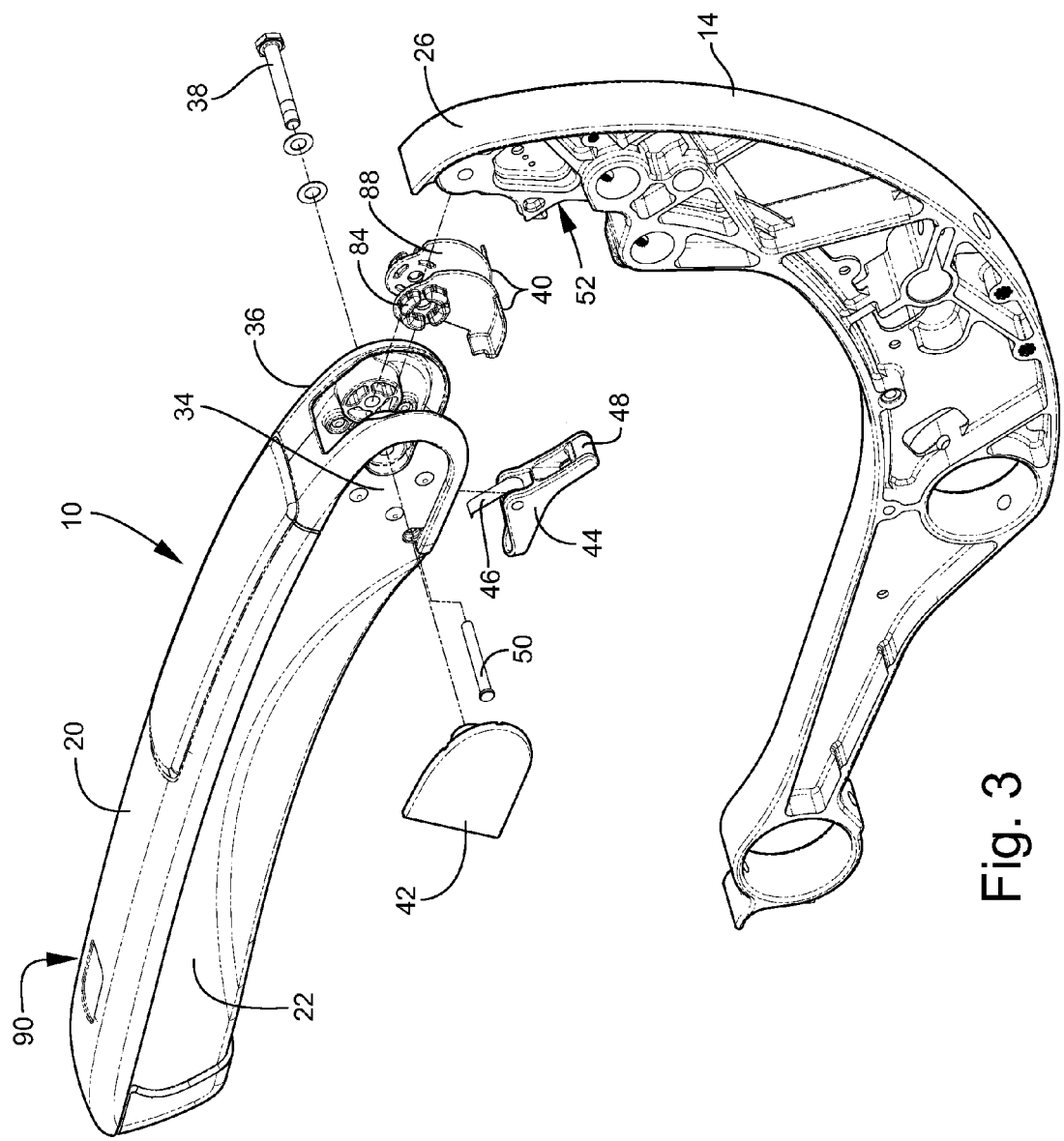
FIG. 3 is an exploded perspective view of the armrest assembly of FIG. 2 detailing part connection.

Referring to FIG. 3, an exploded view of armrest 10 is shown to illustrate the pivotable attachment of armrest 10 to support member 14. Armrest 10 is attached about its rear end 36 by way of single fastener 38 received in sequence through end cover 34, first centering bracket 40, support member 14, second centering member 40 and end cover 34, such that armrest 10 is generally centered and able to pivot relative to end 26 of support member 14. Concealing/decorative covers 42 conceal fastener 38 from view after installation.

Figure 6:
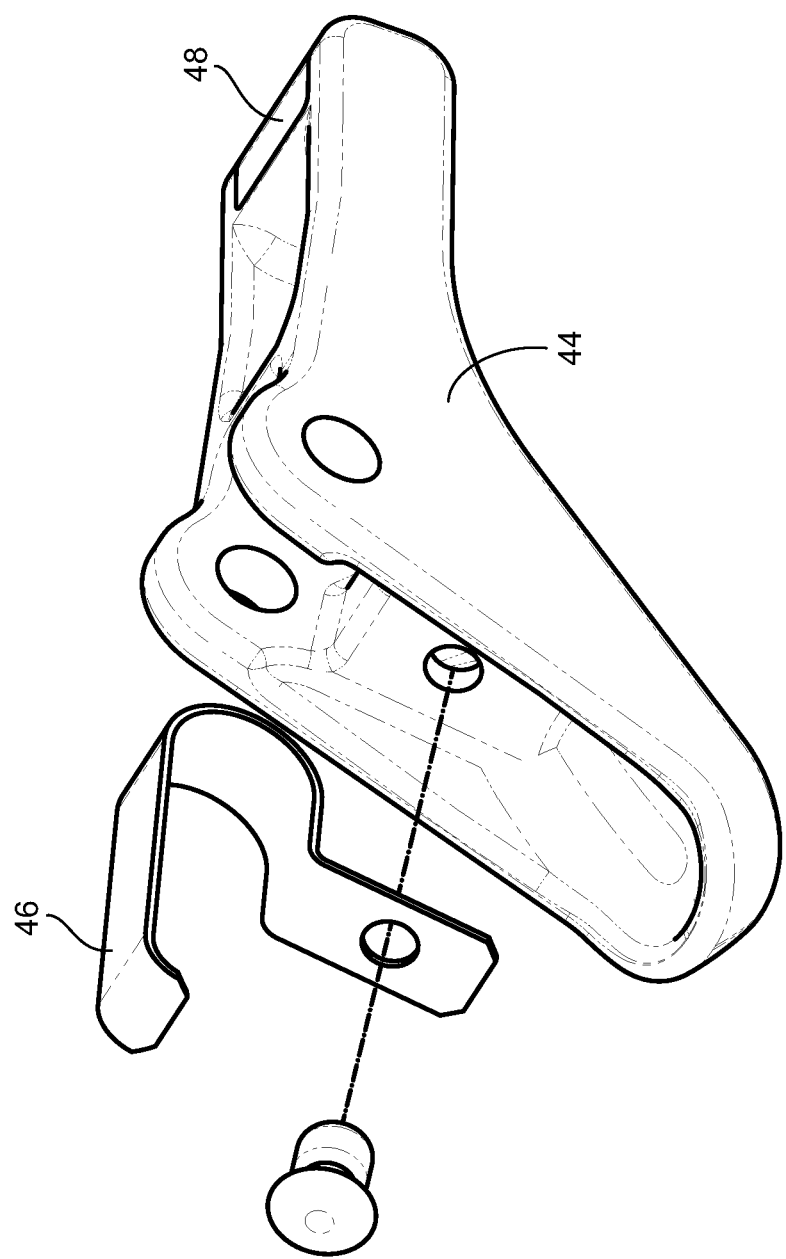
FIG. 6 is an exploded perspective view of the armrest latch body including a leaf spring and strike plate.

Latch 44 is maintained and centered within end 36 of armrest 10 by fastener, pin or the like shown at reference numeral 50. Latch 44 includes leaf spring 46 for biasing movement of armrest 10, and strike plate 48 for contacting support member 14 about surface 52 to provide a mechanical stop to the pivoting movement of armrest 10 relative to support member 14. Thus, strike plate 48, through latch 44 functions to seat against surface 52 of support member 14 to limit the downward rotation of armrest 10 and achieve the generally horizontal or parallel alignment with the angle of seat pan 16. The engagement of strike plate 48 and surface 52 is illustrated in FIG. 2. An enlarged, isolated perspective view of latch 44 is shown in FIG. 6 to further illustrate leaf spring 46 attachment to latch 44.

Figure 4:
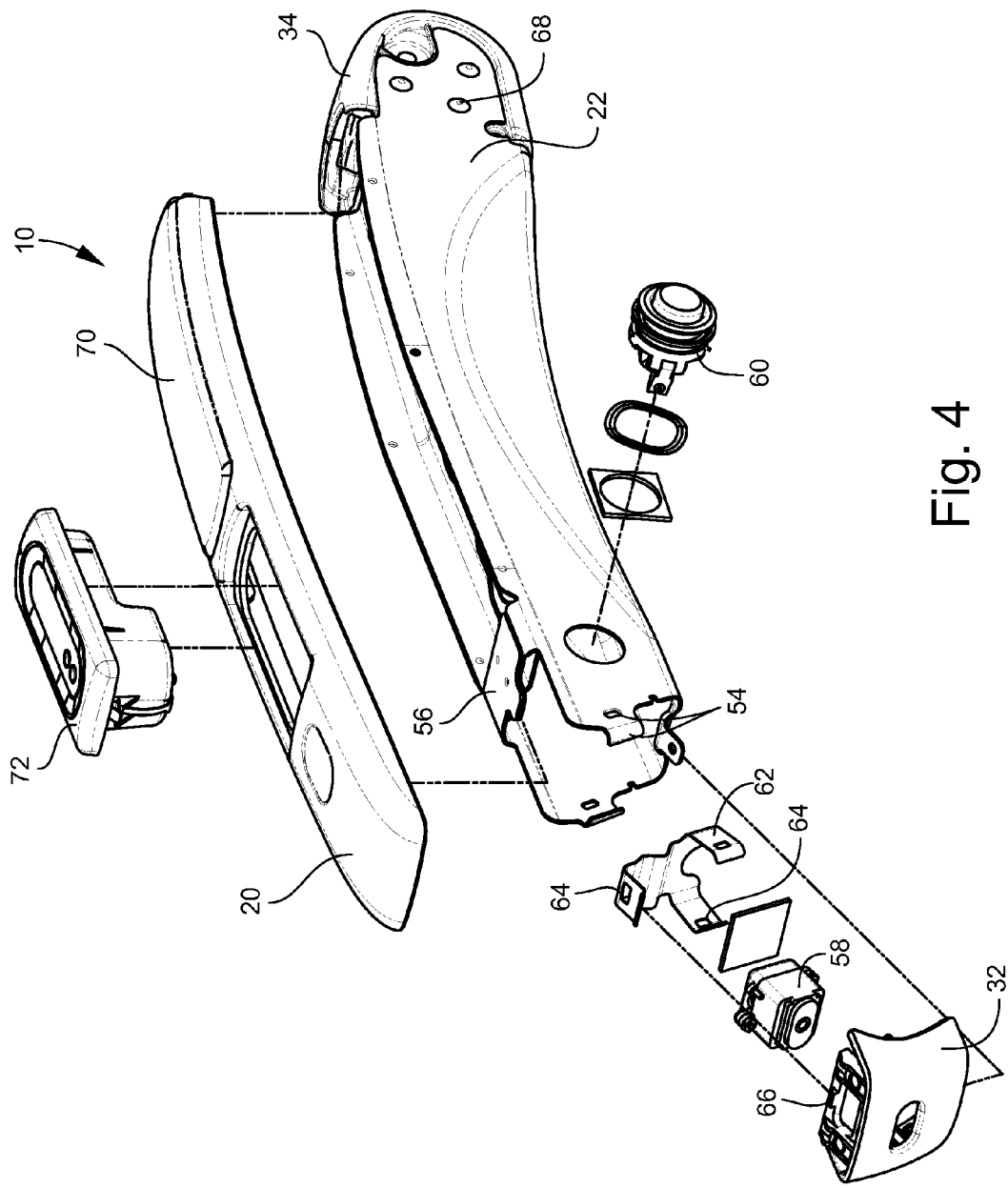
FIG. 4 is an exploded perspective view of the upper armrest portion of the assembly illustrating armpan/armcap engagement.

Referring to FIG. 4, an exploded view of armrest 10 illustrates the various components and control housing of armrest 10. Armrest 10 generally includes armpan 22 defining an elongate channel and including slide-lock structure positioned about a top opening of the channel and at opposing ends thereof for engaging armcap 20, armcap 20 covering the channel and having complimentary slide-lock structure for engagement with armpan 22, armcap 20 further defining at least one structural cavity 74 for receiving overmold material of armpad 70, and armpad 70 covering a portion of armcap 20 and including overmold material that fills the at least one structural cavity 74 of the armcap to retain the armpad on the armcap. Armrest assembly 10 further includes front cover 32 and rear cover 34.

In an exemplary embodiment, armpan 22 is constructed from stamped aluminum chosen for strength and lightweight. Armpan 22 is functionally a housing defining a channel for housing controls, associated cabling and wiring. Armpan 22 further includes structural tabs for attaching the other components thereto. The structural tabs advantageously provide slide-lock attachment for other components without the need for additional parts and typically requiring only a single fastener for maintaining the "locked" position. Specifically, armpan 22 includes snap-fit and indexing features 54 that provide structural support for plastic components such as front cover 32, as well as provide for efficient servicing. Armpan 22 further includes folded welded tabs 56 for slide-lock attachment of armcap 20. Armcap 20 defines a catch on its underside for engaging tab 56, the engagement point being concealed from view from above for aesthetic and tampering reasons, among others.

Armrest 10 houses a control 58, such as an armrest release control, accessible through front cover 32, as well as recline mechanism control 60 through armpan 22, both of which include conventional cable linkage or wiring for performing their designated functions as known to those skilled in the art of seat mechanisms. Bracket 62 engages front cover 32 by way of corresponding slots 64 defined in bracket 62 and tabs 66 defined within end cover 32 to secure the components together with additional fasteners for ready assembly/disassembly. End cover halves are secured together with fasteners 68.

Armcap 20 has a slim, streamline profile and functions to cover armpan 22, support armpad 70, as well as house additional seat controls and passenger interfaces including, but not limited to, display unit 72. An opening defined through armcap 20 allows display unit 72 to pass therethrough and seat upon armcap 20. Display unit 72 may provide visual indicators to the occupant and display soft control buttons, among other features. Display unit 72 may additionally include receiving jacks for receiving plugs. It is envisioned that alternative/interchangeable armcap designs may be provided having alternative features, recesses, control positions, control types, displays, profiles, etc., for customized applications or carrier preferences.

Figure 5:
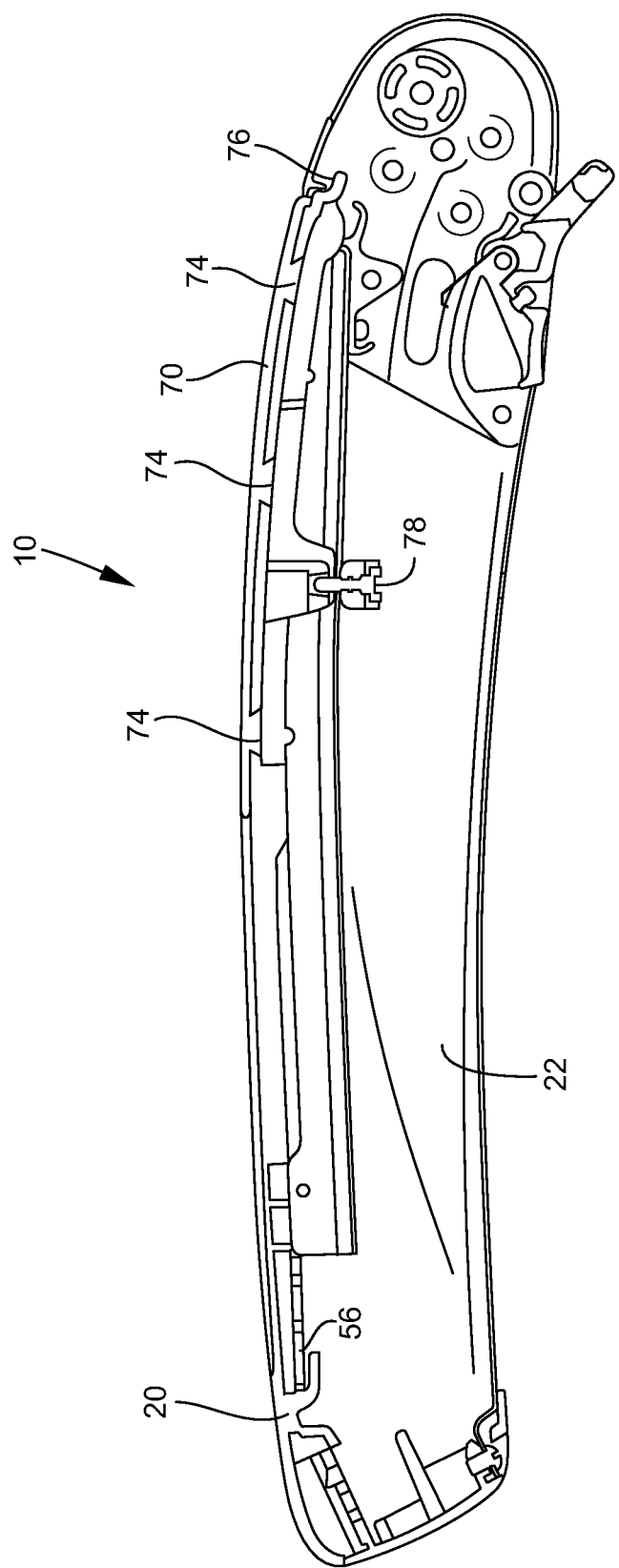
FIG. 5 is a vertical sectional view of the upper armrest portion taken along the longitudinal axis.

Referring to FIG. 5, a sectional view of armrest 10 taken along its longitudinal axis and vertically bisecting armrest 10 is shown to illustrate the overmold detail of armpad 70. In a specific embodiment, armcap 20 is injected molded and armpad 70 subsequently added through an overmold process wherein previously formed armcap 20 is provided, and the desired overmold material (i.e. suitable resulting padding material) is introduced in a flowing/molten/uncured state and flows into the designated position and engagement slots. Overmolding, in contrast to independent molding of components followed by conventional attachment, provides for superior engagement between components and resistance against delamination. Specifically, a plurality of cavities 74, such as the dovetail-shaped cavities shown, are defined within armcap 20 and flooded with overmold material as well as the overlying length of armpad 70. The material is then cured to form the resulting armpad 70. It is envisioned that additional components may be manufactured by similar overmolding techniques to attach components. In alternative embodiments, armpad 70 may be molded separately and include locking features that function in a manner similar to cavities 74 and pull through armcap 20 for product refreshing. Underlying spaced ribs may also be provided for added comfort.

FIG. 5 further illustrates the slide-lock method of attachment of armcap 20 to armpan 22. Specifically, armcap 20 slides along the top surface of welded armpan 22 until armcap 20 engages or "grabs" tab 56 positioned about the front of armrest 10, and subsequently locks in aft at reference numeral 76 via snap fit into the armpan 22. Fastener 78 is used to permanently secure armcap 20 to armpan 22 from beneath, thus positioned to provide limited, discrete access. In an alternative embodiment, captured fastener 78 may be substituted for a detent-style feature molded into armcap 20.

Figure 7:
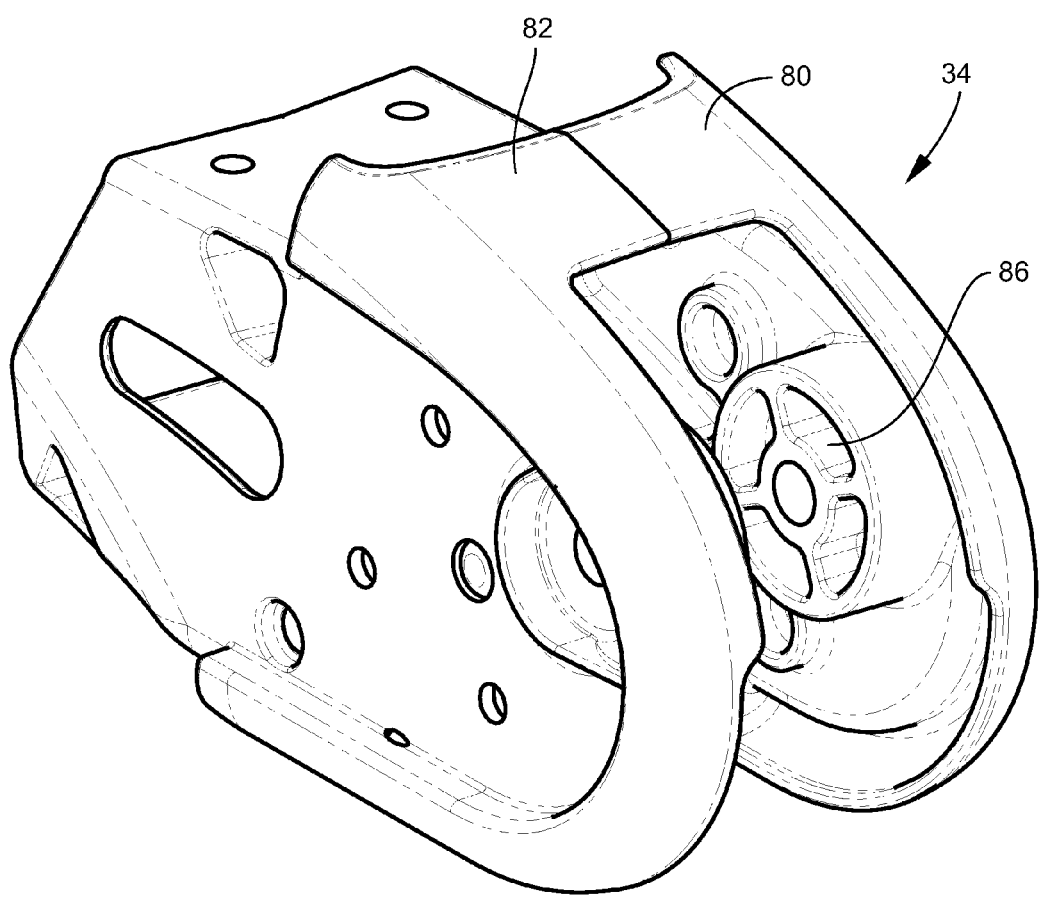
FIG. 7 is a perspective view of the rear end assembly of the armrest.
Figure 8:
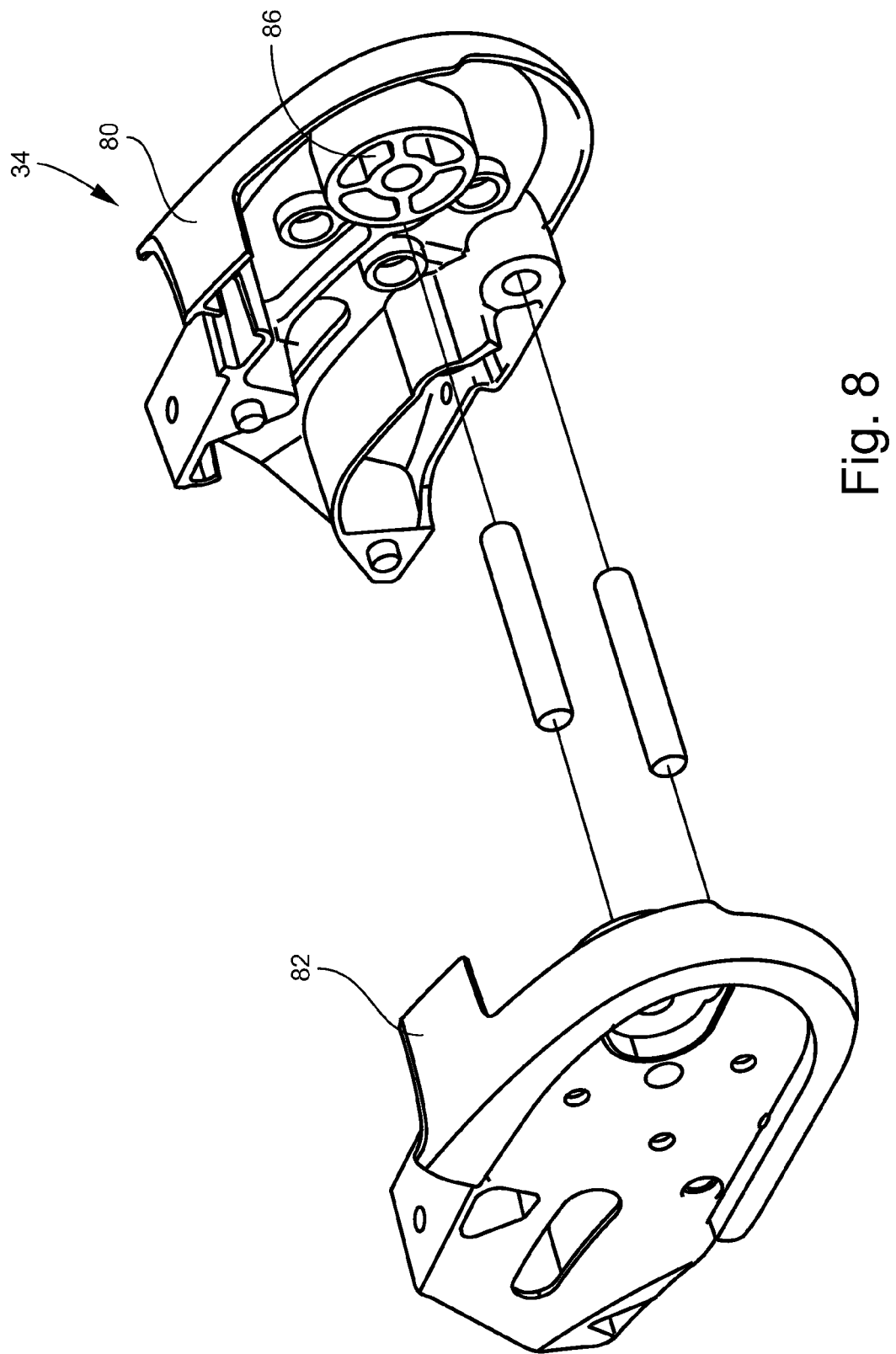
FIG. 8 is an exploded view of the assembly of FIG. 7.

Referring to FIGS. 7 and 8, assembled and exploded views of end cover 34 are provided, respectively, to illustrate component construction and assembly. Specifically, end cover 34 generally includes molded first and second halves 80 and 82 brought together to capture second end 26 of support member 14 therebetween, or alternatively a similar feature of a frame member for intermediate positioned armrests. Halves 80 and 82 further each capture a centering member 40 therebetween, each centering member 40 defining on an exteriorly positioned side at least one complimentary key (FIG. 3 at 84) for engaging a corresponding key slot 86 defined in their respective end cover half 80 and 82 to prevent rotation between said components. Each centering member 40 further defines, an its interiorly positioned side, a generally planar surface (FIG. 3 at 88) for seating against but allowing low-friction rotation relative to end 26. Referring specifically to FIG. 8, halves 80 and 82 are interconnected with spaced apart dowels to prevent rotation between the halves.

The construction of armrest 10 described above provides a lightweight assembly, in an exemplary embodiment weighing about 1.2 lbs. Armrest 10 preferably houses and accommodates associated cabling and wiring for controls therein. As can be seen throughout the figures, for example at directional arrow 90 in FIG. 3, seams are removed from primary load paths for long-term dependability.

While armrest assemblies have been described with reference to specific embodiments and examples, it is envisioned that various details of the invention may be changed without departing from the scope of the invention. Furthermore, the foregoing description of the preferred embodiments of the invention and best mode for practicing the invention are provided for the purpose of illustration only and not for the purpose of limitation.

What is claimed is:

1. An armrest assembly, comprising:
    an armpan defining an elongate channel and including slide-lock structure positioned about a top opening of the channel and at opposing ends thereof;
    an armcap covering the channel and having slide-lock structure complimentary to the armpan slide-lock structure for providing slide-lock engagement therewith, the armcap further defining at least one cavity accessible through an opening through a top of the armcap; and
    an overmolded armpad covering a portion of the armcap, the opening through the armcap, and occupying the at least one cavity;
    wherein the armpad is a unitary, overmolded body and the at least one cavity is shaped such that the armpad is prevented from being pulled apart from the armcap when the armpad occupies the at least one cavity.

2. The armrest assembly according to claim 1, further comprising an armrest support member pivotably connected to one end of the armpan.

3. The armrest assembly according to claim 2, further comprising a rear end cover secured to the armpan, the rear end cover comprising two halves securing therebetween an end of the armrest support member between centering members, and a latch including a strike plate that engages a mechanical stop of the armrest support member to limit pivoting movement of the armpan relative to the armrest support member.

4. The armrest assembly according to claim 3, wherein the latch further comprises a leaf spring for biasing pivoting movement of the armpan.

5. The armrest assembly according to claim 2, wherein the armrest support member defines a gradual curve terminating in spaced-apart first and second ends, and at least one opening therethrough for receiving a seat frame member.

6. The armrest assembly according to claim 1, wherein the armcap further defines an opening therethrough for receiving and seating a display unit.

7. The armrest assembly according to claim 1, further comprising a front end cover secured to the armpan via a bracket, the front end cover housing at least one seat control.

8. The armrest assembly according to claim 1, wherein the armpan defines a scalloped gusset along its length.

9. The armrest assembly according to claim 1, further comprising only a single concealed fastener to secure the armcap to the armpan after slide-lock engagement between the armcap and the armpan.

10. The armrest assembly according to claim 1, further comprising seat controls and associated cabling and wiring housed within at least one of the armpan and the armcap.

11. The armrest assembly according to claim 1, wherein the at least one cavity has a dovetail shape that widens in a direction away from the armpad.

12. An armrest assembly, comprising:
an upper armrest assembly including an armpan defining an elongate channel and including slide-lock structure positioned about a top opening of the channel and at opposing ends thereof, an armcap covering the channel and having slide-lock structure complimentary to the armpan slide-lock structure for providing slide-lock engagement therewith, the armcap further defining at least one cavity accessible through an opening through a top surface of the armcap, and an overmolded armpad covering a portion of the armcap, the opening through the armcap, and occupying the at least one cavity, the armpad being a unitary, overmolded body and the at least one cavity being shaped such that the armpad is prevented from being pulled apart from the armcap when the armpad occupies the at least one cavity; and
an armrest support member pivotably connected to one end of the armpan and supporting the upper armrest assembly.

13. The armrest assembly according to claim 12, wherein the upper armrest assembly further comprises a front end cover secured to the armpan via a bracket, the front end cover housing at least one seat control.

14. The armrest assembly according to claim 12, wherein the upper armrest assembly further comprises a rear end cover secured to the armpan, the rear end cover comprising two halves securing therebetween an end of the armrest support member between centering members, and a latch including a strike plate that engages a mechanical stop of the armrest support member to limit pivoting movement of the armpan relative to the armrest support member.

15. The armrest assembly according to claim 14, wherein the latch further comprises a leaf spring for biasing pivoting movement of the armpan.

16. The armrest assembly according to claim 12, wherein the armrest support member defines a gradual curve terminating in spaced-apart first and second ends, and at least one opening therethrough for receiving a seat frame member.

17. The armrest assembly according to claim 12, wherein the armpan defines a scalloped gusset along its length.

18. The armrest assembly according to claim 12, further comprising only a single concealed fastener to secure the armcap to the armpan after slide-lock engagement between the armcap and the armpan.

19. The armrest assembly according to claim 12, further comprising seat controls and associated cabling and wiring housed within at least one of the armpan and the armcap.

20. The armrest assembly according to claim 12, wherein the at least one cavity has a dovetail shape that widens in a direction away from the armpad.

\* \* \* \* \*